(No Model.)
J. F. GENT.
ART OF EXTRACTING GERMS FROM GROUND CEREALS AND MACHINE USED IN PRACTICING SAID ART.
No. 302,200. Patented July 15, 1884.
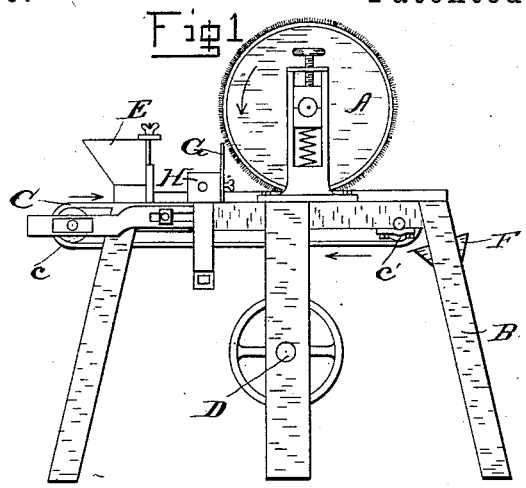
Fig. 1
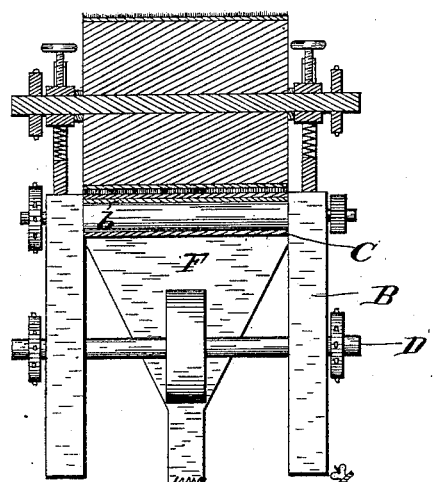
Fig. 3.
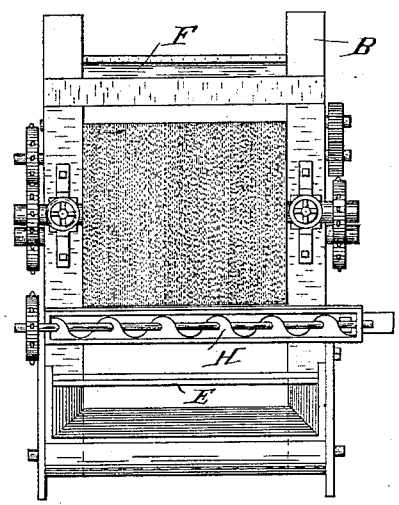
Fig. 2.
Fig. 4.
Witnesses.
W. A. Jones
E. T. Walker
Inventor
Joseph F. Gent
by his Attorney

UNITED STATES PATENT OFFICE.

JOSEPH FRANKLIN GENT, OF COLUMBUS, INDIANA.

ART OF EXTRACTING GERMS FROM GROUND CEREALS AND MACHINE USED IN PRACTICING SAID ART.

SPECIFICATION forming part of Letters Patent No. 302,200, dated July 15, 1884.

Application filed November 19, 1883. (No model.)

*To all whom it may concern:*

Be it known that I, JOSEPH F. GENT, a citizen of the United States, residing at Columbus, in the county of Bartholomew and State of Indiana, have invented a certain new and useful Art of Extracting Germs from Ground Cereals and Machine Used in Practicing said Art; and I do hereby declare the following to be a full, clear, and exact description of the invention, such as will enable others skilled in the art to which it appertains to make and use the same.

The first part of my invention consists of the art of extracting germs from coarsely-ground or broken cereals by first steaming the whole grain, so as to soften and toughen the husk and germ, next coarsely grinding or breaking it, then separating the fine meal and husks from the granular portions and germs, and finally picking the germs from the granular portions by a mechanical picker.

The second part of my invention consists of a machine for picking the germs from ground cereals, the machine being organized to operate with a rotating cylinder thick set with fine teeth made of steel wire or other suitable material, upon a passing film or sheet of the coarsely-ground or broken cereal, so that the teeth of the rotating cylinder will pick the softer germs from the flintier portions.

I will proceed to describe, first, the machine for extracting the germs from the ground cereals, and next the new art in the practice of which I prefer to use the said machine, though other machines may be invented to perform the step of the art assigned to it.

In the annexed drawings, Figure 1 is an end elevation of my machine for extracting or picking germs from ground cereals. Fig. 2 is a plan view of the same. Fig. 3 is a vertical section of the machine in the plane of the axis of the picker-cylinder.

The same letters of reference indicate identical parts in all the figures.

In the machine which I have used with signal practical success the picker-cylinder A is composed of a solid wooden cylinder covered with leather, thick set with straight fine steel-wire teeth, as fine as the teeth of a carding-engine, projecting about one thirty-second to one-sixteenth of an inch, and about one-sixteenth of an inch apart. The cylinder is provided with a suitable shaft, journaled in vertically-adjustable boxes, seated on springs and adjusted by screws, as shown. This picker-cylinder is arranged just above and across the table-top $b$ of a suitable frame or stand, B. An endless apron or belt, C, of cotton cloth, is stretched on cross-rollers $c\ c'$, so that its upper side or ply will move over the table $b$ and under the picker-cylinder. The roller $c$ is mounted in adjustable bearings, as shown, in order that the belt may be properly stretched. The picker-cylinder and belt C are driven to move at the same speed, in directions indicated by the arrows on Fig. 1, from a counter-shaft, D, through the intervention of chain-gearing. The ground material is fed to the belt C from a hopper, E, the discharge-orifice of which is about as long as the belt is wide, so that the ground material will be spread in a film or sheet on the moving feed-belt. The picker-cylinder should be so adjusted that its teeth will nearly touch the feed-belt, so as to enter the sheet of ground material fed along under the cylinder, the teeth pressing the hard flinty or starchy particles into the soft belt and penetrating and carrying away the soft germs. After it has been picked by the rotating picker-cylinder, the cleansed ground material is discharged into a receiving-hopper, F, from which it may be spouted away. The germs extracted from the ground material are removed from the picker-cylinder by a fixed brush or comb, G, and fall thence into a conveyer, H, to be spouted away.

Fig. 4 illustrates a modified form of the machine, a rotating cloth-covered feed-roller, I, having been substituted for the endless feed-belt.

In practicing my new art of extracting germs from ground Indian corn, I proceed as follows: The corn, in the kernel, is first steamed sufficiently to soften and toughen the husks and germs without affecting the interior starchy portion. In that condition it is coarsely ground between corrugated rollers, and the husks and the fine meal are at once separated by suitable screening and by air-currents, in the ordinary manner. The remaining material, which consists of hard granules of the starchy portion of the corn mixed with the softer germs, is then sized by means of suitable sieves or screens, and then subjected, each size separately, to the action of the machine before described, by which the germs are mechanically picked from among the starchy granules. The picker-teeth, while they are able to pierce or enter the soft germs sufficiently to pick them up, merely press the harder starchy granules against the yielding feed-belt without piercing or entering them, and leave them on the belt to be carried away. Other cereals should be treated in substantially the same manner.

I do not claim herein the art of making grits described in an application filed by me November 17, 1883, Serial No. 112,082, nor the art of making germless cornmeal described and claimed in another application filed by me November 17, 1883, Serial No. 112,084.

I claim as my invention—

1. The art of extracting germs from ground cereals, which consists of the following steps, substantially as before set forth, namely: first, steaming the cereal in the kernels to soften the husks and germs; second, coarsely grinding the steamed cereals and separating the husks and fine meal from this coarse grinding; and, third, picking the germs from the remaining granular material.

2. A machine for extracting germs from ground cereals, which consists, in the main, of a rotating picker-cylinder thick set with fine teeth, and a feed device for feeding the ground material in a thin film or sheet under said picker-cylinder.

In testimony whereof I affix my signature in presence of two witnesses.

JOSEPH FRANKLIN GENT.

Witnesses:
E. T. WALKER,
W. M. HANNAY.